United States Patent [19]

Gee

[11] 4,356,790

[45] Nov. 2, 1982

[54] TEMPERATURE INDICATOR

[75] Inventor: Glen R. Gee, Selma, Calif.

[73] Assignee: Huntington Tool, Inc., Duarte, Calif.

[21] Appl. No.: 266,084

[22] Filed: May 21, 1981

Related U.S. Application Data

[63] Continuation of Ser. No. 169,385, Jul. 16, 1980, abandoned, which is a continuation of Ser. No. 962,005, Oct. 20, 1978, abandoned.

[51] Int. Cl.³ ............................................. G01K 11/08
[52] U.S. Cl. ..................................... 116/216; 374/155; 374/160
[58] Field of Search ....... 116/218, 217, 106, DIG. 38; 73/358, 362.8, 352; 337/409, 408, 416, 407, 402, 404, 401; 426/88; 169/42, 57

[56] References Cited

U.S. PATENT DOCUMENTS

| | | | |
|---|---|---|---|
| 945,978 | 1/1910 | Nielson | 73/358 |
| 1,509,110 | 9/1924 | Potter | 116/218 |
| 2,065,635 | 12/1936 | Weinert | 116/105 |
| 2,297,891 | 10/1942 | Huthsing | 116/106 |
| 3,140,611 | 7/1964 | Kliewer | 73/358 |
| 3,456,614 | 7/1969 | Hampton | 116/218 |
| 3,811,402 | 5/1974 | Keeley | 73/358 |
| 3,834,226 | 9/1974 | Pecorella | 116/106 |

Primary Examiner—Anthony V. Ciarlante
Assistant Examiner—Denis E. Corr
Attorney, Agent, or Firm—Christie, Parker & Hale

[57] ABSTRACT

A pop-up type temperature indicator is adapted to be inserted in poultry or other meat to indicate that a preselected temperature has been reached. The indicator includes a housing having a bore, a movable temperature-indicating element in the bore, and a temperature-sensing member having an elongated needle projection from a lower portion of the housing and a head adjacent a lower portion of the temperature-indicating element. The temperature-sensing member is made of metal, and a thin film of a solidified fusible alloy normally secures the head of the temperature-sensing member to the temperature-indicating element to retain the element in a fixed position in the bore. A coil spring biased against the temperature-indicating element applies force to the element for triggering movement of the element in the bore upon melting of the fusible alloy at a preselected temperature sensed by the temperature-sensing member. This releases the element from its fixed position for moving the element out through an upper portion of the body to indicate that the preselected temperature has been reached.

14 Claims, 2 Drawing Figures

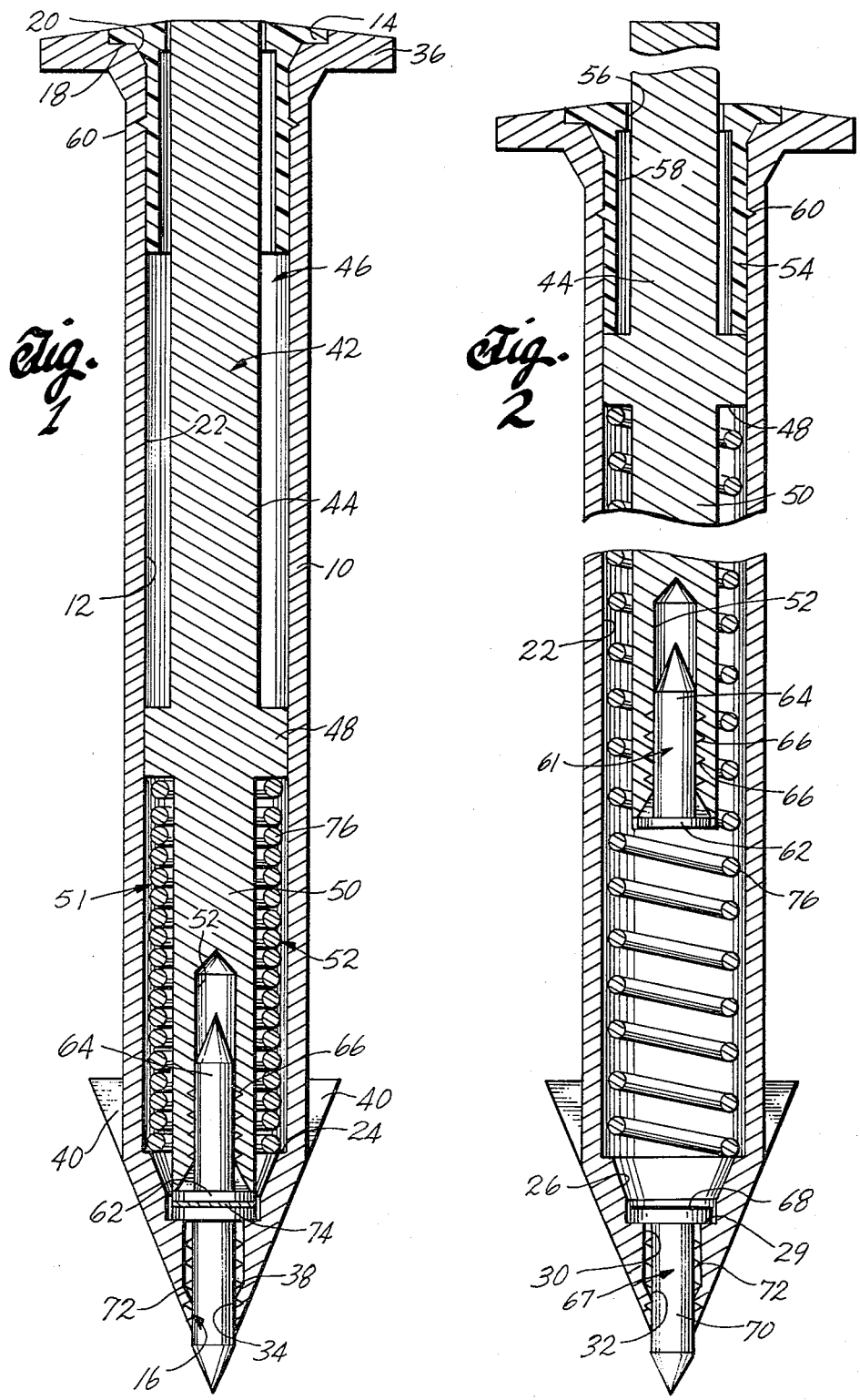

TEMPERATURE INDICATOR

CROSS REFERENCE TO RELATED APPLICATIONS

This is a continuation of application Ser. No. 169,385, filed July 16, 1980, now abandoned which, in turn, is a continuation of Ser. No. 962,005, filed Oct. 20, 1978, now abandoned.

BACKGROUND

This invention relates to temperature indicators, and more particularly to a pop-up type of temperature indicator commonly used for indicating the cooking temperature of poultry and other meats.

In the past, there have been a number of temperature indicators having a pop-up type plunger for indicating when a preselected cooking temperature has been reached. Such temperature indicators have been disclosed, for example, in U.S. Pat. Nos. 945,978; 3,090,235; 3,548,780; 3,682,130; 3,693,579; 3,713,416; 3,759,103; 3,811,402; and 3,965,849. These temperature indicators are customarily used for indicating when poultry or other meat has reached a desired internal temperature. The temperature indicator is typically placed in the poultry or meat prior to packaging and distribution.

In recent years, most of these temperature indicators have included a nylon housing with a pointed tip to facilitate pushing the temperature indicator into the poultry. A plunger inside the housing is normally held in a locked position by a quantity of solidified fusible material such as a fusible metal alloy. When the desired temperature is reached, the fusible alloy melts, releasing a coil spring inside the housing for pushing the plunger out of the housing to signal that the desired internal temperature has been reached.

The prior art temperature indicators suffer from a number of disadvantages. For example, in recent years the fusible metal alloy used in these temperature indicators has become relatively expensive, and for this reason there is a need to minimize the amount of the alloy used in such temperature indicators to reduce the added cost to the consumer as much as possible. For example, it is common for such fusible metal alloys to include indium which is a very expensive metal. In recent years, the cost of some fusible metal alloys containing indium has risen to as high as about $60–70 per pound.

In some prior art temperature indicators, when the fusible material melts, it shatters and metal particles can pass outside the housing of the temperature gauge and into contact with the food.

Of primary concern is the accuracy of pop-up type temperature indicators. The temperature indicators commonly used today have a nylon housing with a pointed tip for being inserted in the poultry. The temperature of the poultry is sensed by the housing and transferred to the fusible alloy. This can result in errors of about 3° F., since the plastic materials commonly used with such temperature indicators are relatively poor heat conductors, and do not consistently sense temperatures uniformly.

The present invention provides a pop-up type temperature indicator which overcomes the above-mentioned disadvantages of prior art temperature indicators.

SUMMARY OF THE INVENTION

Briefly, the temperature indicator includes an elongated housing having a bore, an upper opening at one end of the bore, and a lower opening at the opposite end of the bore. An elongated temperature-indicating element is movable in the bore and has a lower portion adjacent the lower opening of the bore. A temperature-sensing member made of metal has an upper portion disposed within the bore and adjacent the lower portion of the temperature-indicating element, and an elongated needle projecting through the lower opening of the bore and outside the housing. A thin film of a solidified fusible material secures the upper portion of the temperature-sensing member to the lower portion of the temperature-indicating element for retaining the element in a fixed position inhibiting movement of the element in the bore. The thickness of the fusible film is substantially less than the radius of the fusible film. Means are provided for applying a force to the temperature-indicating element for triggering movement of the element toward the upper opening of the housing upon melting of the fusible film at a preselected temperature sensed by the temperature-sensing member. This releases the element from its fixed position and moves the element through the upper opening to thereby indicate that the preselected temperature has been reached.

DRAWINGS

These and other aspects of the invention will be more fully understood by referring to the following detailed description and the accompanying drawings in which:

FIG. 1 is a vertical cross-section showing a temperature indicator in a retracted position; and FIG. 2 is a fragmentary vertical cross-section showing the same temperature indicator in a released position.

DETAILED DESCRIPTION

Referring to the drawings, a temperature indicator includes an elongated tubular housing 10 having an elongated axial bore 12 extending from an upper opening 14 at the top of the housing to a lower opening 16 at the bottom of the housing. The axial bore has a first large diameter portion 18 extending for a short distance adjacent the upper opening 14. This portion of the bore is stepped down to form a relatively short downwardly and inwardly tapered portion 20. At the bottom of the taper, a main portion 22 of the bore is of uniform diameter and extends approximately 90% of the length of the housing. The bottom of the main bore is stepped down to form an annular inwardly projecting shoulder 24, below which is a downwardly and inwardly tapered portion 26 which terminates in a relatively short portion 28 of uniform diameter. This portion of the bore is stepped down further to form an annular inwardly projecting shoulder 29, below which is a narrow elongated portion 30 of uniform diameter. This portion of the bore is stepped down at its lower end to form a downwardly and inwardly tapered section 32 which terminates in a narrow portion 34 of uniform diameter adjacent the lower opening 16 of the housing.

The upper portion of the housing has an outwardly projecting flange 36. The lower portion of the housing has a downwardly and inwardly tapered outer surface 38 that forms a generally pointed lower end of the housing. A number of circumferentially spaced apart triangular shaped flanges with downwardly and inwardly tapering outer surfaces are integrally formed with the outside of the housing immediately above the tapering bottom surface 38.

An elongated temperature-indicating element 42, also referred to herein as a plunger, is slidably disposed in the main portion 22 of the axial bore. The plunger has a long cylindrical upper portion 44 with an outside diameter less than the inside diameter of the bore 22 to provide an annular space 46 surrounding the upper portion 44 of the plunger. An outwardly projecting collar 48 at about the midpoint of the plunger makes a close sliding fit in the main portion 22 of the bore. An elongated cylindrical lower portion 50 of reduced outside diameter extends downwardly below the collar, forming an annular space 51 surrounding the lower portion 50 of the plunger. A narrow circular bore 52 of uniform diameter extends inwardly from the bottom surface of the plunger for about half the length of the lower portion 50 of the plunger.

A tubular end cap 54 is seated in the annular space 46 inside the axial bore adjacent the top end of the housing. The end cap has a short narrow bore 56 of uniform diameter which makes a close sliding fit around the top portion of the plunger. The bore 56 is stepped up to form a wider bore of uniform diameter extending the remaining length of the end cap surrounding and spaced from the upper portion of the plunger. An annular ring 60 on the outside of the end cap makes a snap fit in a correspondingly shaped recess inside the main portion 22 of the axial bore. This enables the end cap to be seated in a snap fit in the upper portion of the housing. The end cap seals against the entry of juices to the inside of the bore.

A T-shaped member 61 shaped as a nail is seated inside the bore 52 in the lower end of the plunger. The T-shaped member 61, which serves as a plunger-retaining element, includes a thin, flat circular head or wafer 62 and a narrow, elongated cylindrical shank 64 having a pointed end. The shank 64 is force fit in the bore 52 of the plunger and a series of barbs 66 on the outer surface of the shank provide a tight friction fit for the member in the bore 52. The head 62 is circular in shape to match the circular configuration at the bottom end of the plunger. The head 62 covers the annular bottom end of the plunger and the opening to the bore 52.

A T-shaped member 67 shaped as a nail is seated inside the lower portions 28, 29, 30, 32 and 34 of the bore through the housing. The T-shaped member 67 includes a generally thin, flat circular head or wafer 68 seated on the shoulder 29 of the axial bore, and a narrow elongated shank 70 having a pointed tip. The shank 70 passes through portions 30, 32 and 34 of the axial bore, and the lower portion of the shank extends through the bottom opening 16 of the housing and protrudes outside the housing so the pointed tip of the shank is spaced below the bottom of the housing. A series of barbs 72 on the shank provide friction means for tightly securing the shank 70 in the lower portion of the axial bore.

The two heads 62 and 68 of the two T-shaped members normally extend parallel to one another and are closely spaced from one another, as shown in FIG. 1.

A thin film 74 of a solidified fusible material such as a fusible metal alloy bonds the two nail heads together. The fusible metal film has a preselected temperature of fusion at which the material melts. In one embodiment, the fusible material comprises a metal alloy of about 57% bismuth, 26% indium, and 17% tin and is sold under the trademark NIDDOR No. 174 by D-ME Company, a division of VSI Corporation.

The fusible metal film, in its solidified state, bonds the two nail heads together for retaining the plunger in the fixed retracted position illustrated in FIG. 1. In the retracted position, the upper end of the plunger is disposed essentially entirely within the confines of the housing. In the illustrated embodiment, the fusible metal alloy film extends generally perpendicularly to the axis of the plunger, although other configurations or orientations of the thin film can be used. The film thickness is substantially less than the radius of the film, and the maximum film thickness is about 0.010 inch, with the preferred film thickness being about 0.005 inch.

A coil spring 76 in the annular space 51 surrounds the lower portion 50 of the plunger and extends from the shoulder 24 of the bore upwardly to the bottom of the collar 48 on the plunger. FIG. 1 shows the spring in its retracted position with the solidified fusible metal film retaining the plunger in its retracted position. The spring normally applies an upward spring force against the base of the collar when the plunger is held in the retracted position.

In using the temperature indicator, the pointed end of the housing and of the shank 70 are inserted in the item the temperature of which is being sensed. Since the shank 70 or needle portion of the temperature-sensing member is made of metal and is generally sharp, the device can be easily inserted in the poultry, especially by automatic means. When the internal temperature of the item reaches the temperature of fusion of the fusible metal alloy, which in the described embodiment is 174° F., the fusible metal alloy melts, releasing the plunger from its fixed position. Under the bias of the spring, which moves to its released position shown in FIG. 2, the plunger is forced upwardly in the axial bore, so the upper portion of the plunger extends out through the top of the housing to indicate that the preselected temperature has been reached.

In the illustrated embodiment, the housing, the plunger and the end cap are all made of a plastic material such as nylon. The T-shaped temperature sensing member 67 is made from a metal having consistently more uniform and predictable heat transfer characteristics than nylon or similar plastic materials. Preferably, the T-shaped member 61 also is made of metal, although it also could be made from a high temperature resistent plastic material. In the illustrated embodiment, both T-shaped members are identical.

Preferably, the T-shaped members are made of tin plated steel. The nail heads are individually wetted in a bath of the desired fusible alloy material, and the nail heads are later placed adjacent one another and reheated to re-melt the alloy after which subsequent solidification bonds the two nail heads together via the thin fusible metal film between them.

In one embodiment, the coil spring provides about 300 grams of force, and the solidified metal alloy film locks the two nail heads together with a threshold force of about 1500 grams.

The thin film of fusible material provides an accurate temperature indicator with a minimum amount of fusible metal alloy material being required, which can provide a relatively inexpensive temperature indicator, since a major cost of the device is the fusible metal alloy.

The solid metal pin and nail head provided by the T-shaped memeber provides more uniform temperature sensing ability than a temperature indicator having a plastic temperature sensor for conducting heat to the fusible metal alloy layer. The metal nail consistently provides uniform heat transfer in a direct path to the metal alloy film, and thereby provides a more reliable temperature indicator than one relying on plastic material for heat transfer to the fusible material.

The temperature indicator also avoids the possibility of metal fragments from the fusible alloy reaching the exterior of the housing. When the alloy film reaches the melting point, the melted alloy which wets the two nail heads stays on the two nail heads, rather than scattering.

Thus, the present invention provides a safe, reliable and relatively inexpensive temperature indicator.

I claim:

1. A temperature indicator comprising:
   an elongated housing having a first bore extending axially through it, with an upper opening at an upper end of the first bore and a lower opening that opens into a second bore extending through a lower end of the housing, at least a portion of the second bore being of smaller diameter than the first bore, forming an annular shoulder in the housing between the first bore and the second bore;
   an elongated temperature-indicating element slidable axially in the first bore and having a narrow passage extending into the element, the narrow passage having an opening adjacent said annular shoulder;
   a first T-shaped member having (1) a temperature-sensing needle with the pointed end projecting through the second bore and outside the housing, and (2) a temperature-sensing head seated on the annular shoulder for retaining the first T-shaped member in the housing;
   a second T-shaped member having (1) a shank secured in the narrow passage of the temperature-indicating element, and (2) a head adjacent the head of the first T-shaped member;
   the needle and the head of the first T-shaped member being made of metal, the head of the second T-shaped member having a second surface on a side thereof opposite the shank, the head of the first T-shaped member having a first surface on a side thereof opposite the needle, the first and second surfaces being adjacent one another and extending generally normal to the axis of the first bore and the second bore;
   a thin film of a solidified fusible material between the first and second surfaces of the T-shaped members retaining the second T-shaped member in a fixed position for inhibiting sliding axial movement of the temperature-indicating element in the first bore, the fusible film having a film thickness substantially less than the radius of the fusible film; and
   means for applying a force to the temperature-indicating element for triggering sliding movement of the element in the first bore upon fusion of said fusible film at a preselected temperature sensed by the first T-shaped member for releasing the element from its fixed position to move the element through the upper opening of the first bore in the housing.

2. Apparatus according to claim 1 in which the second T-shaped member is made of metal.

3. Apparatus according to claim 1 wherein the needle of the first T-shaped member and the shank of the second T-shaped member each include friction means for securing them in their respective bores.

4. Apparatus according to claim 1 in which the fusible film is less than about 0.010 inch thick.

5. A temperature indicator comprising:
   an elongated housing having a first bore, an upper opening at one end of the first bore, and a second bore in the housing extending from the first bore to a lower opening in the lower end of the housing, at least a portion of the second bore being of smaller diameter than the first bore to form a shoulder in the housing between the first bore and the second bore;
   an elongated temperature-indicating element movable in the first bore and having a lower portion adjacent the shoulder in the housing;
   a temperature-sensing member comprising a first T-shaped member made of metal and having a head portion disposed within the first bore and engaging the shoulder, and an elongated needle portion extending through the second bore and projecting through the lower opening of the second bore and outside the housing;
   a second T-shaped member reversed in position with respect to the first T-shaped member and having a head portion providing the lower protion of the temperature-indicating element, and an elongated shank securing the second T-shaped member to the temperature-indicating element;
   a thin film of solidified fusible material between the head portion of the temperature-sensing member and the head portion of the temperature-indicating element for retaining the element in the bore, the fusible film having a film thickness substantially less than the radius of the fusible film; and
   means for applying a force to the temperature-indicating element for triggering movement of the element in the first bore upon fusion of said fusible material at a preselected temperature sensed by the temperature-sensing member for releasing the element from its fixed position to move the element through the upper opening.

6. Apparatus according to claim 5 wherein the head portions of the two T-shaped members are closely spaced apart and are generally planar and parallel to one another, and wherein the fusible layer secures the adjacent surfaces of the head portions to each other.

7. Apparatus according to claim 6 in which at least the head portion of the second T-shaped member is made of metal.

8. Apparatus according to claim 5 including friction means on the needle portion of the first T-shaped member and on the shank of the second T-shaped member for securing the members to the housing and to the temperature-indicating element, respectively.

9. Apparatus according to claim 8 wherein the friction means comprises barbs projecting from the needle portion of the first T-shaped member securing it in the first bore of the housing; and barbs projecting from the shank portion of the second T-shaped member securing it in a narrow passage in the temperature-indicating element.

10. Apparatus according to claim 5 in which the fusible film is less than about 0.010-inch thick.

11. A temperature indicator comprising:
    an elongated housing having a first bore, an upper opening at one end of the first bore, and a second bore in the housing below the first bore, the second bore extending from the first bore to a lower opening at the lower end of the housing, at least a portion of the second bore having a diameter less than that of the first bore to form a shoulder in the housing between the first bore and the second bore;

an elongated temperature-indicating plunger movable in the first bore of the housing;

a plunger-retaining element shaped as a nail and having a shank secured to the plunger and a head adjacent a lower end of the plunger;

a temperature-sensing member shaped as a nail having a head and a needle, said needle being frictionally disposed in said second bore with a portion of the needle projecting through the lower opening of the second bore and outside the housing, the head of the temperature-sensing member being seated on the shoulder for retaining the temperature-sensing member inside the housing, the heads of the plunger-retaining element and the temperature-sensing member being narrowly spaced apart from one another;

a thin film of solidified, fusible material in the narrow space between the heads of the plunger-retaining element and the temperature-sensing member securing the heads to one another adjacent the shoulder to retain the plunger in a fixed position inhibiting movement of the plunger in the first bore, the fusible film having a film thickness substantially less than the radius of the fusible film; and means for applying a force to the plunger for triggering movement of the plunger in the first bore upon fusion of said fusible material at a preselected temperature sensed by the temperature-sensing member for releasing the plunger from its fixed position to move the plunger through the upper opening.

12. Apparatus according to claim 11 wherein the heads are generally planar and are generally parallel to one another.

13. Apparatus according to claim 12 in which the temperature-sensing member is made of metal.

14. Aparatus according to claim 11 comprising means frictionally securing the shank of the plunger-retaining element to the lower end of the plunger.

* * * * *

UNITED STATES PATENT AND TRADEMARK OFFICE
CERTIFICATE OF CORRECTION

PATENT NO. : 4,356,790

DATED : November 2, 1982

INVENTOR(S) : Glen R. Gee

It is certified that error appears in the above-identified patent and that said Letters Patent is hereby corrected as shown below:

On the title page :

[63] Related U.S. Application Data: ", which is a continuation of Ser. No. 962,005, Oct. 20, 1978, abandoned." should read -- , which is a continuation of Ser. No. 962,005, Nov. 20, 1978, abandoned. --. [57] Abstract, line 6, "projection" should read -- projecting --. Column 1, line 8, ", filed Oct. 20, 1978," should read -- , filed Nov. 20, 1978,--.

Signed and Sealed this

Nineteenth Day of April 1983

[SEAL]

Attest:

GERALD J. MOSSINGHOFF

Attesting Officer  Commissioner of Patents and Trademarks